April 15, 1924.　　　H. W. ANDERSON　　　1,490,882
HOLDER ATTACHMENT
Filed Nov. 13, 1922
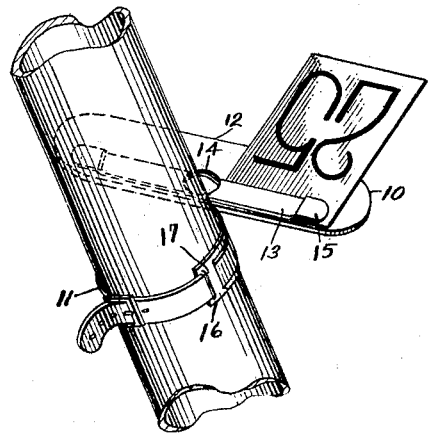
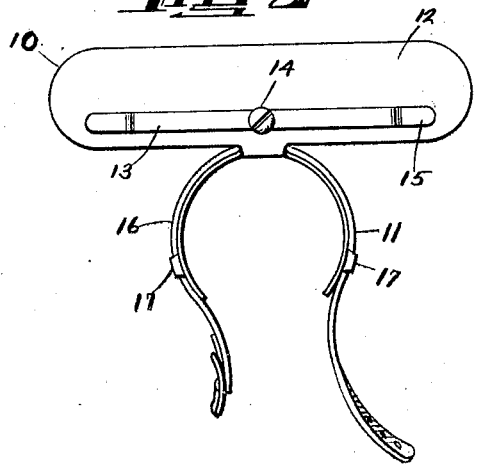
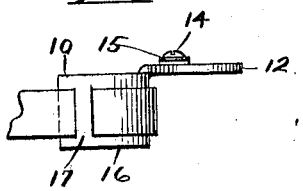
Howard W. Anderson.
INVENTOR.
BY *Victor J. Evans,*
ATTORNEY.

Patented Apr. 15, 1924.

1,490,882

UNITED STATES PATENT OFFICE.

HOWARD WEBESTER ANDERSON, OF CEDARHURST, NEW YORK.

HOLDER ATTACHMENT.

Application filed November 13, 1922. Serial No. 600,612.

*To all whom it may concern:*

Be it known that I, HOWARD W. ANDERSON, a citizen of the United States, residing at Cedarhurst, in the county of Nassau and State of New York, have invented new and useful Improvements in Holder Attachments, of which the following is a specification.

This invention relates to holder-attachments.

Some of the objects of the present invention are: to produce as an article of manufacture a device for supporting and displaying a note bearing card or the like from the steering column of an automobile for instance, so that a "starter" of automobiles may readily accommodate guests, patrons, etc., by the use of such a device on each automobile in the distribution of his call cards, and the chauffeur of each automobile so equipped can readily apprise himself when to proceed to the starting point when called by the "starter;" to produce a simple device of the character mentioned which is efficient as constructed and which is effectual in use; and with these and other objects in view the invention resides in the particular construction, relative disposition, and functions of the parts hereinafter fully described and illustrated in the accompanying drawing, in which:

Figure 1 is a perspective view illustrating the use of the device in connection with the steering column of an automobile, as one instance of use.

Figure 2 is a plan view.

Figure 3 is an end view.

Referring now more particularly to the several views of the drawing, it will be apparent that, the device of the present invention, generally, comprises a holder 10 and attaching means 11 therefor. The holder comprises a supporting plate 12, and a flat springy strip 13 which is attached to the supporting plate 12 by means of a fastening element 14 such as the screw-bolt shown. The opposite ends of the strip 13 are crimped as at 15, and these portions of the strip are normally yieldably in contact with said supporting plate 12. The attaching means 11 comprises an arcuate member 16 which has up-struck therefrom portions 17, and a buckle-strap 18 is connected to the arcuate member 16 by virtue of said portions 17. It will be noted that a single piece of material is utilized to obtain the plate 12 and the arcuate member 16.

From the foregoing, it will be manifest that, there has been described a device which can be readily attached to the steering column of an automobile; number bearing call cards may be easily conspicuously displayed to the view of the operator of the automobile; the device is simple and inexpensive.

What is claimed is:

1. A holder-attachment comprising a piece of material stamped, bent and formed to provide a supporting plate and an arcuate attaching member; means having portions which are yieldingly engageable with said supporting plate, and attaching means connected to said arcuate member.

2. A holder-attachment comprising a piece of material stamped, bent and formed to provide a supporting plate and an arcuate attaching member; a crimped flexible strip attached to the said supporting plate having portions which normally touch said supporting plate, and a buckle-strap carried by said arcuate member.

In testimony whereof I hereby affix my signature.

HOWARD WEBESTER ANDERSON.